(12) United States Patent
Nicholson et al.

(10) Patent No.: US 11,467,646 B2
(45) Date of Patent: Oct. 11, 2022

(54) CONTEXT DATA SHARING

(71) Applicant: Lenovo (Singapore) Pte. Ltd., Singapore (SG)

(72) Inventors: John Weldon Nicholson, Cary, NC (US); Daryl Cromer, Raleigh, NC (US); Howard Locker, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 406 days.

(21) Appl. No.: 16/368,139

(22) Filed: Mar. 28, 2019

(65) Prior Publication Data

US 2020/0310513 A1 Oct. 1, 2020

(51) Int. Cl.
| | | |
|---|---|---|
| G06F 1/00 | (2006.01) | |
| G06F 1/3206 | (2019.01) | |
| G06F 9/445 | (2018.01) | |
| G06F 9/4401 | (2018.01) | |
| G06F 21/32 | (2013.01) | |

(52) U.S. Cl.
CPC .......... *G06F 1/3206* (2013.01); *G06F 9/445* (2013.01); *G06F 9/4418* (2013.01); *G06F 21/32* (2013.01)

(58) Field of Classification Search
None
See application file for complete search history.

(56) References Cited

U.S. PATENT DOCUMENTS

| | | | | |
|---|---|---|---|---|
| 5,555,376 A | * | 9/1996 | Theimer | H04L 63/102 |
| | | | | 709/229 |
| 6,367,020 B1 | * | 4/2002 | Klein | G06F 21/35 |
| | | | | 726/26 |
| 6,418,536 B1 | * | 7/2002 | Park | G06F 1/3231 |
| | | | | 713/323 |
| 9,215,654 B2 | * | 12/2015 | Clark | H04W 52/0235 |
| 10,206,036 B1 | * | 2/2019 | Feng | H04R 1/406 |
| 2006/0140452 A1 | * | 6/2006 | Raynor | G06F 1/3231 |
| | | | | 382/115 |
| 2006/0285747 A1 | * | 12/2006 | Blake | G06T 7/162 |
| | | | | 382/180 |
| 2008/0144179 A1 | * | 6/2008 | Mimura | G02B 5/0252 |
| | | | | 359/599 |
| 2012/0210741 A1 | * | 8/2012 | Fujiwara | G10K 11/17881 |
| | | | | 62/126 |
| 2018/0343562 A1 | * | 11/2018 | Nalukurthy | H04L 9/3215 |
| 2019/0129492 A1 | * | 5/2019 | Chen | G06F 1/266 |
| 2020/0218814 A1 | * | 7/2020 | Rothenbuhler | G06F 3/1285 |
| 2020/0310513 A1 | * | 10/2020 | Nicholson | G06F 1/3206 |
| 2021/0325486 A1 | * | 10/2021 | Cai | G01D 5/145 |

FOREIGN PATENT DOCUMENTS

WO  WO 2019/022734 A1 * 1/2019 ............. G06F 21/31

* cited by examiner

*Primary Examiner* — Mohammed H Rehman
(74) *Attorney, Agent, or Firm* — Ference & Associates LLC

(57) ABSTRACT

One embodiment provides a method, including: receiving, at an information handling device in a low power mode, a wake indication; waking, responsive to the receiving, the information handling device from the low power mode; receiving, at the awoken information handling device, context data obtained by at least one other device; and performing an action based on the received context data. Other aspects are described and claimed.

14 Claims, 3 Drawing Sheets

CONTEXT DATA SHARING

BACKGROUND

Various components of many information handling devices ("devices"), for example smart phones, tablets, stand-alone digital assistants, laptop and personal computers, other electronic devices, and the like, may be always-on. For example, a device may maintain an audio capture device (e.g., a microphone, etc.) in an always-on state to continuously monitor for any actionable voice input. As another example, a device may maintain an image/video capture device (e.g., a camera, etc.) in an always-on state to monitor for a user's presence. Components maintained in an always-on state must consume a certain amount of the device's battery power to function.

BRIEF SUMMARY

In summary, one aspect provides a method, comprising: receiving, at an information handling device in a low power mode, a wake indication; waking, responsive to the receiving, the information handling device from the low power mode; receiving, at the awoken information handling device, context data obtained by at least one other device; and performing an action based on the received context data.

Another aspect provides an information handling device, comprising: a processor; a memory device that stores instructions executable by the processor to: receive, when the information handling device is in a low power mode, a wake indication; wake, responsive to the receiving, the information handling device from the low power mode; receiving, at the awoken information handling device, context data obtained by at least one other device; and perform an action based on the received context data.

A further aspect provides a system, comprising: a plurality of connected devices configured to transmit context data to an information handling device in a low power mode, wherein the system is configured to: gather context data using the plurality of connected devices; wake, responsive to the gathering, the information handling device from the low power mode; send the context data to the awoken information handling device; and perform, using the information handling device, an action based on the received context data.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
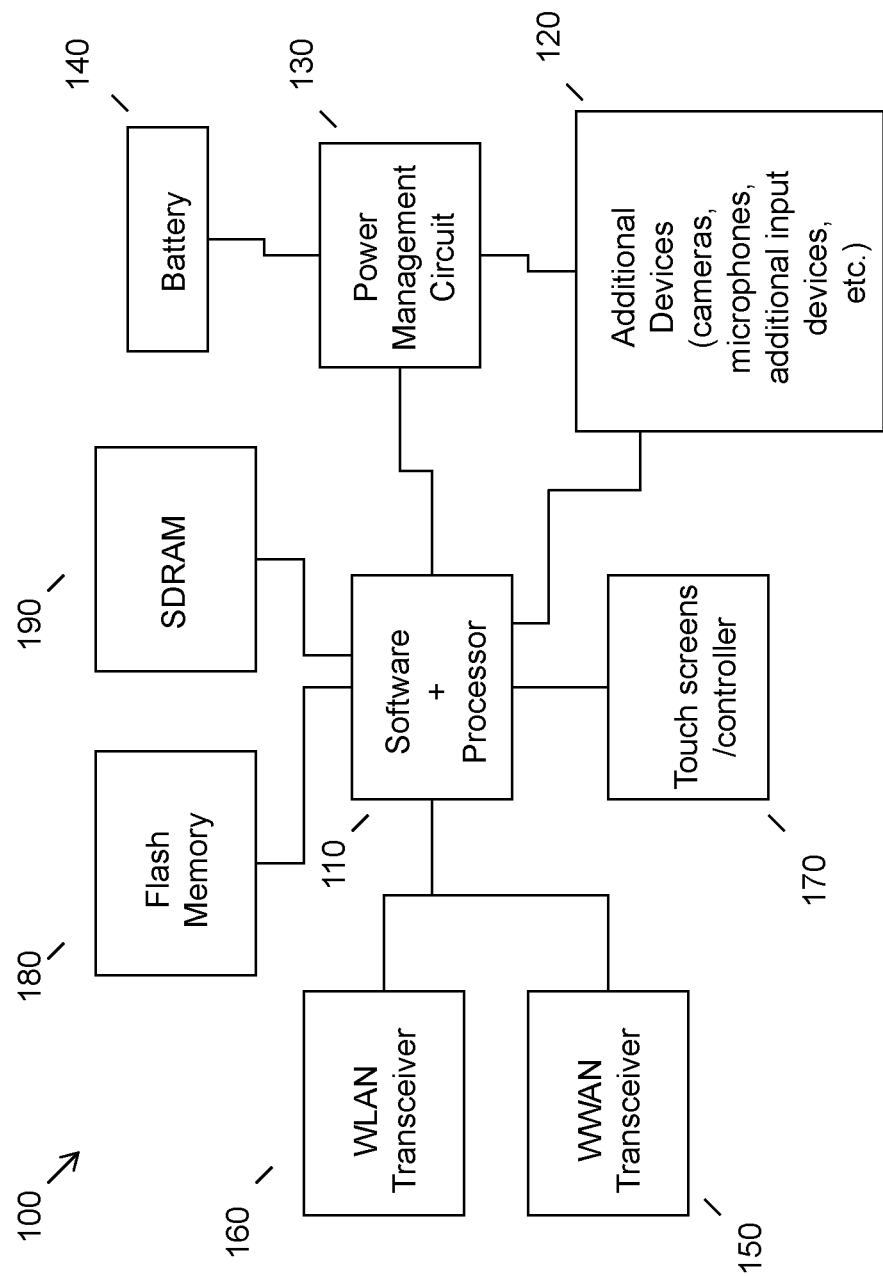
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Devices comprising always-on components (e.g., audio capture devices, image/video capture devices, etc.) continuously provide processing power to these components, even when the components are not being actively used. In order to prevent a large amount of device power from being consumed, the processing responsibilities are generally handled by small, low-power microcontrollers associated with each of the always-on components.

Although the microcontrollers do not consume a great deal of battery power, they still consume some power, which places a measurable drain on the battery. Additionally, the microcontrollers have limited performance/function capabilities and are generally unable to execute complex tasks (e.g., tasks based on context, etc.). Additionally still, if a device comprises a plurality of always-on components, the battery drain may be more significant. Furthermore, although a device's always-on components may be able to gather some context data, they may not be able to gather the complete context of the surrounding area because each of the components has a limited capture range and a limited capability to analyze contextual information. For example, a camera located on the front of the device may be able to detect motion occurring in front of it but may be blind to any motion occurring behind it. In a similar example, a microphone of the device may be able to capture audio within a predetermined range of the device but may not be able to detect any audio outside of the predetermined range (e.g., audio occurring in another room, etc.)

Accordingly, an embodiment may leverage the functionality of surrounding Internet of Things (IoT) devices to gather context data associated with a device's surroundings and thereafter provide the device with an indication of an appropriate action to take based on the data. In an embodiment, context data (e.g., user position data, object position data, ambient light data, other environmental data, etc.) may be obtained by one or more IoT devices. The obtained context data may be processed on the IoT devices or may be processed by the cloud, which may complex decisions based on IoT input. The gathered context data may thereafter be communicated (e.g., via the cloud, another wireless transmission technique, etc.) to a user's device. In an embodiment, the user's device may be in an energy-saving/lower-power mode (e.g., standby mode, hibernation mode, etc.) while context data is gathered and/or processed by the IoT devices. In an embodiment, responsive to receiving a wake indication (e.g., an indication notifying the device that relevant context data has been gathered, etc.), the device may be awoken and may thereafter perform an action based on the received context data. Such a method may allow a device to take advantage of more comprehensive context analysis without consuming substantially any battery.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, motion sensor such as an accelerometer or gyroscope, a thermal sensor, etc. System 100 often includes one or more touch screens 170 for data input and display/rendering. System 100 also typically includes various memory devices, for example flash memory 180 and SDRAM 190.

Figure 2:
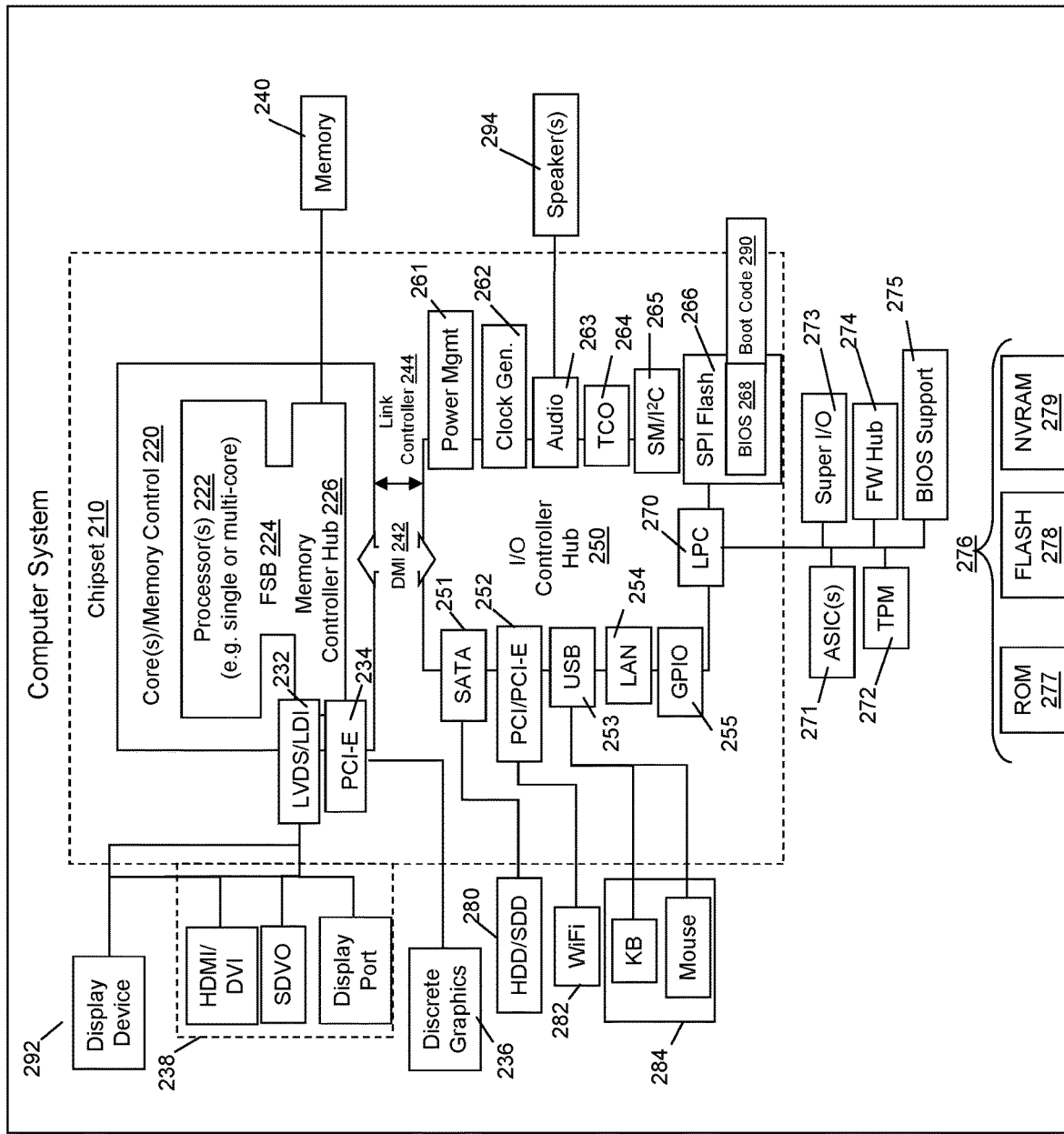
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as smart phones, tablets, smart speakers, televisions, laptop and personal computer devices generally, and/or electronic devices that are capable of connecting with and receiving communication from other IoT devices. For example, the circuitry outlined in FIG. 1 may be implemented in a tablet or smart phone embodiment, whereas the circuitry outlined in FIG. 2 may be implemented in a laptop.

Figure 3:
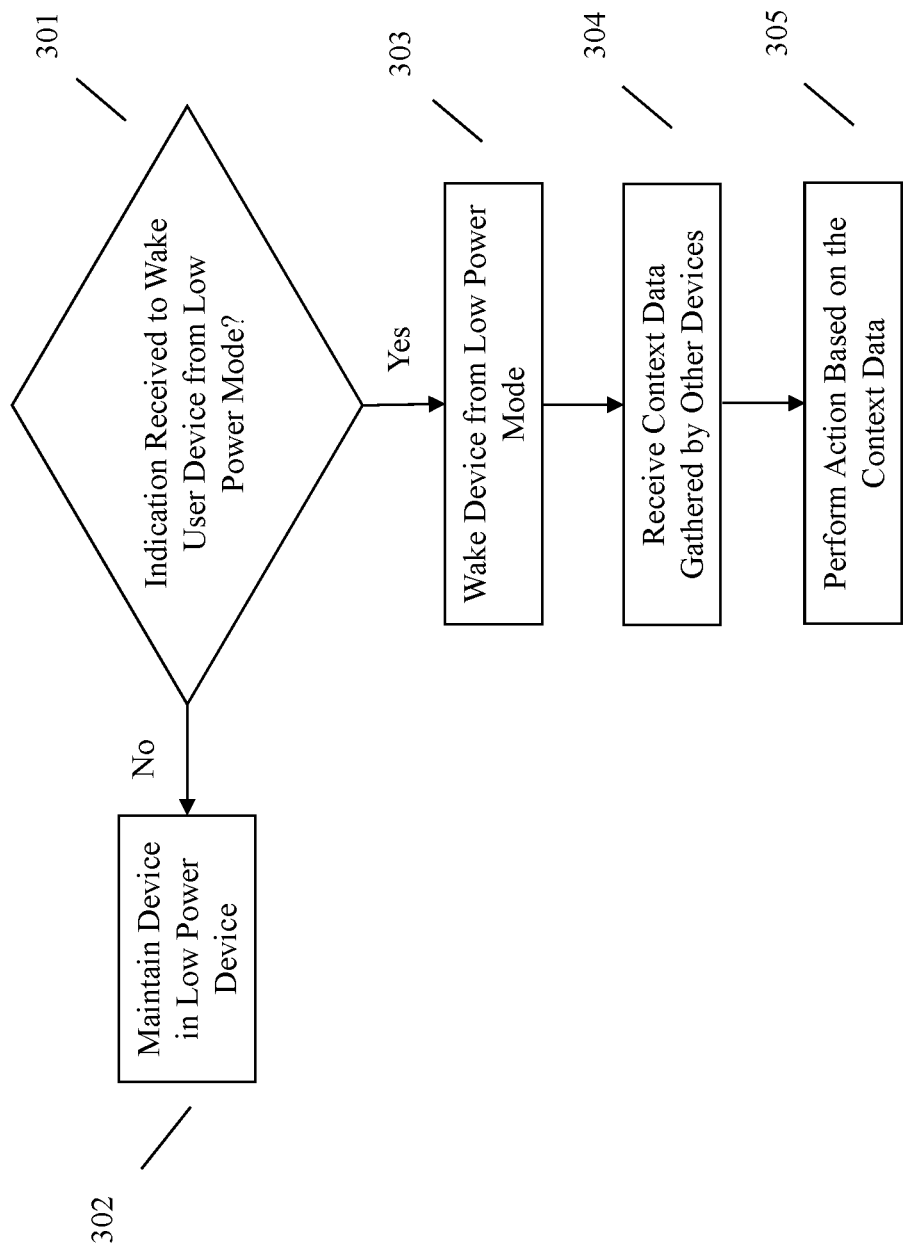
FIG. 3 illustrates an example method of gathering and processing context data using one or more Internet of things (IoT) devices.

Referring now to FIG. 3, an embodiment may gather various types of context data using one or more IoT devices and thereafter communicate this data to a device in a low-power mode. In an embodiment, context data may be received at a device in a low-power mode. In the context of this application, a low power mode may be any device operation mode during which components of the device consume little to no power (e.g., sleep mode, hibernation mode, etc.).

In an embodiment, context data may be virtually any type of data associated with aspects of the device's surroundings such as a position of the device, positions of other devices or objects, positions and/or identities of users, other types of environmental data, etc. In an embodiment, the context data may be collected using one or more data gathering devices (e.g., one or more audio capture devices, image capture devices, motion sensing devices, heat and/or light sensing devices, etc.). In an embodiment, the context data may be data that is not attainable by the device. For example, the context data may be data associated with contextual events occurring in a different room from which the device is positioned. In another example, the context data may be unattainable by the device because the data gathering components of the device may not be able to gather the type of context data being received.

In an embodiment, the context data may be gathered by one or more IoT devices that may thereafter communicate the context data to the device. In an embodiment, the one or more IoT devices may be of a variety of different device types (e.g., audio capture devices, video capture devices, other smart sensing devices, etc.) positioned in various locations around the surrounding area (e.g., various positions around the same room as the device, various positions in one or more different rooms than the room the device is positioned in, etc.).

In an embodiment, the gathered context data may be processed away from the device. For example, in an embodiment, each IoT device may independently gather and locally process context data. The processed context data may be held by each device or shared among the IoT devices to identify one or more combinations of actionable context data (i.e., context data indicating a need for a user device to perform an action). Additionally or alternatively, if one or more of the IoT devices are connected to a cloud-based server, the cloud server may do some or all of the data processing. Responsive to at least one IoT device and/or connected server identifying actionable context data, a transmission may be sent to the user device comprising an instruction to wake up and/or also comprising the relevant context data and/or the suggested action. The transmission may be communicated to the user device using a wireless transmission technique (e.g., BLUETOOTH, PAN, WLAN, WAN, another wireless protocol, etc.). As an example of the foregoing, responsive to an IoT device identifying that a user is approaching a user device (e.g., a laptop, etc.), the IoT device may send a communication to the laptop to wake up from its low power mode and activate a display screen of the device.

At 301, the user device may receive a wake indication prompting the device to wake from the low power mode. In an embodiment, the wake indication may be sent to the user device by the IoT device or cloud server and may either be a dedicated wake indication (i.e., a transmission sent solely to the user device commanding it to wake up) or it may be part of a larger transmission comprising the gathered context data. Responsive to receiving, at 301, the wake indication, an embodiment may, at 303, wake the device from the low power mode. Once awoken, an embodiment may, at 304, receive the gathered context data. Conversely, responsive to not receiving, at 301, the wake indication, an embodiment may, at 302, maintain the device in low power mode.

Once the context data is received, an embodiment may, at 305, perform an action based on the context data. In an embodiment, the action may be one or more of a variety of different actions. For example, responsive to receiving context data indicating that a user is within a predetermined distance from the device (e.g., 5 feet, 10 feet, in the same room as the device, etc.), an embodiment may automatically activate one or more device components (e.g., a display screen, one or more input devices, etc.). In another, similar example, responsive to receiving context data indicating that a user has left the predetermined distance, an embodiment may automatically lock the device components. In yet another example, responsive to receiving context data indicating the number of individuals participating in a conference call (e.g., a VoIP call, etc.), an embodiment may adjust a microphone noise cancellation field based on the number of participants (e.g., narrow field if only one participating participants, widen field if multiple participants, etc.). In yet a further example, responsive to receiving context data indicating a user's identity, an embodiment may enable certain device functions for authorized users (e.g., user profiles, protected applications, etc.) and/or lock or disable certain device functions for unauthorized users (e.g., login functions, setting functions, transaction functions, etc.). An individual having skill in the art may recognize that the examples provided above are not limiting and that other actions, not explicitly mentioned and described here, may also be performed.

In an embodiment, after a user device has performed an action based on the context data, the user device may return back to the low power mode (e.g., immediately after the action is performed, a predetermined time after the action is performed, etc.). An embodiment may then remain in the low power mode until another indication is received to wake up.

The various embodiments described herein thus represent a technical improvement to conventional context data gathering techniques. Using the techniques described herein, a device in a low power mode may receive context data obtained from other connected IoT devices. Once the context data is received, an embodiment may wake the device and thereafter perform an action based on the context data. Such a method may allow a device to understand context without requiring the addition of a microcontroller that consumes battery power. Additionally, such a method may be utilized to leverage processing capabilities that may be even greater than when the device is active and fully powered.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A system, comprising:
a plurality of connected devices configured to transmit context data to an information handling device in a low power mode, wherein the system is configured to:
gather context data using at least one sensor associated with the plurality of connected devices, wherein the context data provides an indication of a user proximate to the information handling device;
adjust a noise cancellation field based on a number of participants interacting with the user;
process the context data to identify that the user is an authorized user;
wake, responsive to the gathering, the information handling device from the low power mode;
send the context data to the awoken information handling device;
obtain additional context data, wherein the additional context data indicates that an unauthorized user is proximate to the information handling device; and
transmit the additional context data to the information handling device.

2. A method, comprising:
receiving, at an information handling device in a low power mode, a wake indication, wherein the wake indication is received from at least one other device responsive to context data being gathered by the at least one other device, wherein the at least one other device detects a presence of a user proximate to the information handling device based on the context data;
waking, responsive to the receiving, the information handling device from the low power mode;
receiving, at the awoken information handling device, context data obtained by the at least one other device, wherein the context data indicates that the user is proximate to the information handling device;
adjusting a noise cancellation field based on a number of participants interacting with the user;
performing, without additional user input, an action based on the received context data, wherein performing the action comprises disabling one of: a transaction function and a setting adjustment function on the information handling device for the user;
wherein the at least one other device comprises a plurality of Internet of Things (IoT) devices that are disparately located from the information handling device; and
wherein the context data is obtained by at least one sensor on the plurality of IoT devices that is not also present on the information handling device.

3. The method of claim 2, wherein receiving the wake indication comprises receiving at least one of: an indication of the action corresponding to the context data and a wake instruction.

4. The method of claim 2, wherein the context data is processed by at least one of: the at least one other device and a server associated with the at least one other device.

5. The method of claim 2, wherein the context data comprises position data for at least one user in a location associated with the information handling device.

6. The method of claim 5, wherein performing the action comprises adjusting a characteristic of the information handling device responsive to the position data indicating that the at least one user is within a predetermined threshold distance of the information handling device.

7. The method of claim 2, wherein the context data comprises activity data engaged in by at least one user in a location associated with the information handling device.

8. The method of claim 7, wherein performing the action comprises adjusting a characteristic of the information handling device responsive to the activity data indicating a type of activity engaged in by the at least one user.

9. An information handling device, comprising:
a processor;

a memory device that stores instructions that are executed by the processor to:

receive, when the information handling device is in a low power mode, a wake indication at the information handling device, wherein the wake indication is received from at least one other device responsive to context data being gathered by the at least one other device, wherein the at least one other device detects a presence of a user proximate to the information handling device based on the context data;

wake, responsive to the receiving, the information handling device from the low power mode;

receive, at the awoken information handling device, context data obtained by the at least one other device, wherein the context data indicates that the user is proximate to the information handling device;

adjust a noise cancellation field based on a number of participants interacting with the user;

perform, without additional user input, an action based on the received context data, wherein performing the action comprises disabling one of: a transaction function and a setting adjustment function on the information handling device for the user;

wherein the at least one other device comprises a plurality of Internet of Things (IoT) devices that are disparately located from the information handling device; and wherein the context data is obtained by at least one sensor on the plurality of IoT devices that is not also present on the information handling device.

10. The information handling device of claim 9, wherein the instructions that are executed by the processor to receive the wake indication comprise instructions that are executed by the processor to receive at least one of: an indication of the action corresponding to the context data and a wakeup instruction.

11. The information handling device of claim 9, wherein the context data is processed by at least one of: the at least one other device and a server associated with the at least one device.

12. The information handling device of claim 11, wherein the instruction that are executed by the processor to perform the action comprise instructions that are executed by the processor to adjust a characteristic of the information handling device responsive to a position data indicating that the at least one user is within a predetermined threshold distance of the information handling device.

13. The information handling device of claim 9, wherein the context data comprises position data for at least one user in a location associated with the information handling device.

14. The information handling device of claim 9, wherein the context data comprises activity data engaged in by at least one user in a location associated with the information handling device and wherein the instructions that are executed by the processor to perform the action comprise instructions that are executed by the processor to adjust a characteristic of the information handling device responsive to the activity data indicating a type of activity engaged in by the at least one user.

* * * * *